United States Patent Office 2,812,322
Patented Nov. 5, 1957

2,812,322

METHOD OF PREPARING DIRECT DYES

Robert Carland Conn, Bound Brook, and George Milton Friese, Plainfield, N. J., assignors to American Cyanamid Company, New York, N. Y., a corporation of Maine No Drawing. Application November 13, 1953, Serial No. 392,030

9 Claims. (Cl. 260—143)

This invention relates to the manufacture of certain direct azo dyes in a physical form having improved valuable properties as more fully defined below:

It is an object of this invention to convert certain direct azo dyes into a physical form characterized by rapid dissolution in cold water, and the development of increased dye strength when applied in such a solution. A still further object of this invention is to provide direct azo dyes with improved solubility particularly in cold water.

One important use of water-soluble azo dyes is in the coloring of paper stock. Such dyes are generally added directly to the paper beater. Dry addition of the dyes is preferred to avoid the bother and expense of dissolving the dye separately. It has been recognized for some years that when the water used in the beater is cold, as it will generally be during the winter months, certain dyes containing the benzidine and stilbene nucleus do not dissolve readily, and develop only part of their strength making it more expensive to use them.

Dyes which are known to give trouble in this respect are:

| | |
|---|---|
| Pheno Brown 3GXX super concentrate | Color Index 596. |
| Pheno Brown MRS | Color Index 420. |
| Pheno Orange 2RS concentrate | Color Index 326. |
| Pheno Violet N concentrate | Color Index 394. |
| Direct Garnet BY concentrate | Color Index 375. |
| Stilbene Yellow 2G | Color Index 622. |
| Stilbene Yellow SX | Color Index 622. |
| Stilbene Orange 5RB | Color Index 621. |
| Pheno Fast Yellow B concentrate | Color Index 814. |
| Pheno Orange RN concentrate | Color Index 415. |
| Pheno Fast Red F | Color Index 419. |

It has also been noted that some of these dyes do not develop the same shade in cold water that they do when they are properly dissolved. It is desirable, therefore, by providing these dyes with good cold water solubility, to avoid or minimize these problems.

We have now found that by subjecting certain direct azo dyes to a process involving the expenditure of mechanical work such as grinding with a shearing force, mulling, etc., it is possible to convert these direct dyes into products of unusual qualities, first among which is the ability to dissolve readily in cold water and to give dyeings of tinctorial strength equal to and often superior to that obtained by dissolving the dyestuff separately in warm water. Another advantage of this method of treatment is that in the case of certain colors we have actually noted an improvement in shade over that normally obtained by solution of the dye in cold water.

Special conditions of our treatment which are referred to above consist essentially of the employment of apparatus of the attrition type that is designed to produce grinding by attrition and shearing as distinct from impact. Practical examples of such apparatus are the edge-runners and mullers currently available commercially, and the ball mill. These make it possible to obtain a desirable product by the expenditure of work on the dyestuff by exerting a shearing force as contrasted to a reduction of particle size which could be effected by impact. This is shown by the fact that the pulverizer and microatomizer are mills which do not give the desired improvement although they are capable of producing a very finely divided product. We have also found, for example, that extrusion under pressure will effect sufficient shearing forces to produce the desired results.

Although the behavior of certain dyestuffs treated according to this invention is so much different from that of dyestuffs which have not been so treated, we have not been able to attribute this improvement to any definite physical change. However, with the understanding that we do not intend to limit our invention, thereby, we venture to suggest that one possible explanation for the improvement observed may be the introduction of a greater degree of orientation into the particles making up the dye aggregate. This may be thought of as resulting in a greater degree of crystallinity in the treated dyestuff, and we have noted that under the polarizing microscope, the ball milled sample mulled in oil appears more crystalline than does a corresponding sample which has not been ball milled. Also, there is evidence of greater crystallinity in the dye aggregate when viewed in contact with water through the polarizing microscope. As indicative of the fact that the improvement in solubility in cold water is not due to a reduction in the particle size, gas absorption data indicate no difference in the surface area of the regular azo dye and the same material which has been ball milled. We have demonstrated that micro pulverized dyestuff with a two or three fold increase in the surface area does not exhibit improved color strength when added directly to the paper beater.

It has also been found that in some cases, as for example Stilbene Yellow (Color Index 620), it is important to have some water present along with the dyestuff in order to get the desired improvement in strength development in cold water. In the case of such dyes that are ball milled in the presence of water, the dye cakes almost entirely on the sides of the mill and is subjected to a pounding rather than to a pulverizing action. It is particularly interesting that in cases where water is not added that even though the dye remains as a loose powder, and can be pulverized more readily, the strength develops very slowly and incompletely. The exact effect that the water exerts in these cases is not known, and it is interesting that the strength development obtained by mulling etc., is retained even after the water is driven out of the dyestuff by drying.

Not all direct azo dyes are improved by our process. On the other hand, certain specific compounds show not only an increase in the paper beater dye strength at low temperatures, but in addition, there is an improvement in shade.

My invention may be illustrated by the following examples in which the parts are by weight.

*Example 1*

One hundred parts of Stilbene Yellow, Color Index No. 620 made by heating 4 nitrotoluene-2-sulfonic acid with caustic soda was placed in a ball mill together with fifteen parts of water and a charge of steel balls equal to two and one-half times the weight of the dye. The mill was rolled for sixteen hours with the dye forming a heavy cake on the inside of the mill. Samples were taken every four hours, dried, ground to pass 40 mesh and tested as follows for dye strength in cold water:

A one gram sample of the dye was added with stirring to 1500 ml. of water at 40° F.; stirring was continued for fifteen minutes at this temperature and a 3" x 9" strip of Whatman No. 1 filter paper immersed for exactly 30 seconds. This was removed and dried at room temperature; dye strength was determined by visual comparison with a suitable standard or by measuring reflectance with the spectrophotometer.

The following increase in strength was noted for the samples taken at four hour intervals. Shade and strength are compared against dyeings made in the same way with the dye first dissolved in warm water.

| Hours Mulled | Percent Strength Increase (40° F.) | Solution Dyeing | |
|---|---|---|---|
| | | Shade | Strength, Percent |
| 0 | 0 | | 63 |
| 4 | 47 | sl. red | 85 |
| 8 | 55 | very sl. red | 100 |
| 12 | 55 | very sl. red | 100 |
| 16 | 55 | close | 100 |

Increasing the amount of water in the ball mill to 20% or 25% by weight of the dyestuff did not appreciably effect the grinding time. When ball milling was repeated with only 5% by weight of water added, the dye remained in a loose, powdered condition in the mill and the dye strength in water at 40° F., increased only 30% in 16 hours. Very poor results were obtained when enough water was added to give a thin paste in the mill.

*Example 2*

A Simpson Mix-Muller manufactured by the National Engineering Co. of Chicago was charged with Stilbene Yellow (Color Index 620) made as described in Example 1 and enough water to bring the moisture content up to 20%. The mixture was mulled for a total of twenty-four hours with samples being taken at intervals throughout the mulling. Maximum strength, as measured by paper beater dyeing, was achieved in sixteen hours. Heat was applied to the jacket of the Mix-Muller and the moisture content of the dye reduced to five percent. Salt was added for standardization and the dye removed from the muller. When added dry to the paper beater at a temperature of 40° F. the mulled product gave fifty percent better strength than it did without mulling. Also, the same strength was developed when added dry at 40° F., as when added in solution. Paper beater dyeings were made by the following:

Bleached sulfite pulp equal to 20 parts dry was placed in a beater and sufficient water was added to bring the contents to a volume of 500 parts. After mixing for five minutes, 10 parts of a 4% solution of rosin size was added followed by one part of standardized dye. After mixing for 20 minutes, 15 parts of a 4% solution of alum was added, and after five minutes more, the mixture was diluted with water to a volume of 1000 parts. After stirring for five minutes, two 200 part portions were further diluted to 1000 parts with water and, after mixing thoroughly, were formed into sheets on a mold and pressed dry.

*Example 3*

A blend of 80 parts of Stilbene Yellow (Color Index 620) and 20 parts of water was placed in a Hoover Muller and ground at a pressure of 150 lbs. per square inch. After 100 revolutions of the muller plate, the dye had the same strength when added dry to cold water according to the procedure given in Example 1 as when added in solution. The shade of the dye was also slightly greener than that of the unmulled material. When mulled for an additional 100 revolutions, the strength was increased by another 5% and the shade became very slightly brighter.

*Example 4*

A mix consisting of 80 parts of Stilbene Yellow (Color Index 620) and 20 parts of water was placed in a hydraulic press moulding form. The dye was extruded under a compression of 2000 lbs. per square inch, dried and ground. When added dry to 40° F. water, a strength increase of 45% was noted; the shade of the dye was less green than in the previous examples.

A sample of standardized Stilbene Yellow (Color Index 622) mixed with 15% of water was ground through a micro-atomizer. This material although now very fine showed only a 10% increase in dye strength when added dry to water at 40° F.

*Example 5*

A sample of standardized, commercial Stilbene Orange (Color Index 621) was rolled overnight in a ball mill. The dye strength in paper beater dyeing at 40° F. was found to have increased 25% over that of the unmilled dye. The shade was brighter and yellower after milling.

*Example 6*

A mixture consisting of 44 parts of Direct Brown (Color Index No. 420, made by coupling tetrazotized benzidine with one mole of salicyclic acid and one mole of 2-amino-8-naphthol-6-sulfonic acid) 21 parts of soda ash, 16 parts of salt, and 19 parts of water was placed in a Lancaster intensive mixer and mulled for a total of twenty hours. When added dry to 40° F. water as in Example 1 the unmulled mixture was only 50% as strong as when added in solution. After mulling, the dry addition strength was increased to 90% that obtained when added in solution.

Similar results were obtained when a mixture of "unblended" dye, salt and soda ash was ball milled with ten parts of water. When the mixture was first dried and ball milled without any addition of water, the "dry addition" strength at 40° F. increased very slowly and was only improved by 15% after sixteen hours of milling.

*Example 7*

A sample of commercial, standardized, Direct Orange (Color Index 415 made by coupling tetrazotized benzidine with one mole salicylic acid and one mole naphthionic acid) was rolled in a ball mill for 24 hours. The dye strength when added as a dry powder to the paper beater at 40° F. was increased by 75% and was equal to the strength shown by the dye when already completely dissolved in warm water.

*Example 8*

A sample of commercial Direct Violet (Color Index 394) showing the characteristic differences in shade described by Holmes (Color Trade Journal 13 54, 1923) was rolled overnight in a ball mill. In contrast to the starting material which dissolved in cold (40° F.) water to give a dull blue solution, the milled material dissolved to give a red-violet solution characterized by an entirely different absorption curve as measured on the spectrophotometer. When dissolved in warm (85° F.) water, the unmilled dye gave a red-violet solution characterized by a single peak red curve; the milled dye, gave this same curve, regardless of whether it was dissolved cold or hot. When added dry to the paper beater at 40° F., the unmilled dye gave a dull blue dyeing whereas the milled dye gave a violet dyeing equal in shade and brightness to dyeings made at 85° F. Shade differences were so great in all of these cases, that strength differences could not be accurately estimated.

Similar results to the above were obtained when the dye was milled on a Lancaster Intensive Mixer. Only a very slight shade change was observed, however, when the dye was ground through a Mikro-atomizer.

We claim:
1. A method of improving the characteristics of direct azo dyes selected from the group consisting of Stilbene Yellow (Color Index 620), Stilbene Orange (Color Index 621), Direct Brown (Color Index 420), Direct Orange (Color Index 415), and Direct Violet (Color In- dex 394), which comprises subjecting said azo dyes to mechanical work in an apparatus operating by attrition and shearing, as distinguished from impact.

2. A method of improving the characteristics of direct azo dyes selected from the group consisting of Stilbene Yellow (Color Index 620), Stilbene Orange (Color Index 621), Direct Brown (Color Index 420), Direct Orange (Color Index 415), and Direct Violet (Color Index 394), which comprises subjecting said azo dye to mechanical work in a ball mill.

3. A method of improving the characteristics of direct azo dyes selected from the group consisting of Stilbene Yellow (Color Index 620), Stilbene Orange (Color Index 621), Direct Brown (Color Index 420), Direct Orange (Color Index 415), and Direct Violet (Color Index 394), which comprises subjecting said azo dye to mechanical work in a ball mill with about 15 to 25% by weight water.

4. A method of improving the characteristics of direct azo dyes selected from the group consisting of Stilbene Yellow (Color Index 620), Stilbene Orange (Color Index 621), Direct Brown (Color Index 420), Direct Orange (Color Index 415), and Direct Violet (Color Index 394), which comprises subjecting said azo dye to mechanical work in an edge runner.

5. A method of increasing the color strength of Stilbene Yellow (Color Index 620) which comprises subjecting 100 parts of this dye and from 15 to 25 parts water to mechanical work in a ball mill.

6. A method of increasing the color strength of Direct Brown (Color Index 420) which comprises subjecting 100 parts of this dye and approximately 20 parts of water to mechanical work in a ball mill.

7. A method of increasing the color strength of Stilbene Orange (Color Index 621) which comprises subjecting this dye to mechanical work in a ball mill.

8. A method of increasing the color strength of Direct Orange (Color Index 415) which comprises subjecting this dye to mechanical work in a ball mill.

9. A method of increasing the color strength of Direct Violet (Color Index 394) which comprises subjecting this dye to mechanical work in a ball mill.

References Cited in the file of this patent

UNITED STATES PATENTS

| | | |
|---|---|---|
| 2,007,386 | Stanley et al. | July 9, 1935 |
| 2,098,798 | Thornton | Nov. 9, 1937 |
| 2,174,954 | Vesce | Oct. 3, 1939 |
| 2,361,301 | Libby et al. | Oct. 24, 1944 |
| 2,402,167 | Lang et al. | June 18, 1946 |
| 2,687,410 | Hanke | Aug. 24, 1954 |

OTHER REFERENCES

Fierz-David et al.: Processes of Dye Chemistry, 1949, page 377.

Manufacture of Pulp and Paper, vol. IV, 1938, page 23.